United States Patent
Lueh

(10) Patent No.: US 6,968,546 B2
(45) Date of Patent: Nov. 22, 2005

(54) DEBUGGING SUPPORT USING DYNAMIC RE-COMPILATION

(75) Inventor: Guei-Yuan Lueh, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 621 days.

(21) Appl. No.: 09/822,090

(22) Filed: Mar. 30, 2001

(65) Prior Publication Data

US 2002/0144241 A1 Oct. 3, 2002

(51) Int. Cl.[7] ............................................. G06F 9/45
(52) U.S. Cl. .................... 717/158; 717/106; 717/118; 717/130; 717/140; 717/148
(58) Field of Search ......................... 717/130, 124, 717/106, 118, 140, 148, 158

(56) References Cited

U.S. PATENT DOCUMENTS 5,901,315 A * 5/1999 Edwards et al. ............ 717/124
6,078,744 A * 6/2000 Wolczko et al. ............ 717/153
6,298,477 B1 * 10/2001 Kessler ....................... 717/145
6,637,024 B1 * 10/2003 Johnson et al. ............. 717/124
6,662,358 B1 * 12/2003 Berry et al. ................. 717/128
2001/0047510 A1 * 11/2001 Angel et al. ................... 717/4

OTHER PUBLICATIONS

Cooperman, Max and Thomas, Jeff, "Poor Man's Watchpoints", p. 37–44, ACM SIGPLAN Notices, vol. 30, No. 1, Jan. 1995, retrieved from ACM Portal database on Feb. 16, 2004.*

Kessler, Peter B., "Fast Breakpoints: Design and Implementation", p. 78–84, Proceedings of the ACM SIGPLAN'90 Conference on Programming Language Design and Implementation, Jun. 20–22, 1990, retrieved from ACM database Feb. 16, 2004.*

* cited by examiner

Primary Examiner—Tuan Dam
Assistant Examiner—Mary Steelman
(74) Attorney, Agent, or Firm—Blakely, Sokoloff, Taylor & Zafman LLP

(57) ABSTRACT

The present invention is a method and system to support debug. A function is re-compiled when a field watch for a field is activated. The function includes a byte code sequence having a field byte code that accesses or modifies the field. The re-compiled function provides a native code and occupies a code space. An instrumentation code corresponding to the field watch of the field is generated. The instrumentation code is inserted to the native code.

39 Claims, 9 Drawing Sheets 1. aload 6
2. getfield #42
3.     mov    ecx, DWORD PTR [esp + 10h]
4.     mov    edx, DWORD PTR [ecx + 04h]
5.     Mov    DWORD PTR [esp + 08h], edx 6.     cmp    BYTE PTR [F10B78h], 01h
7.     jnz    NoWatch
8.     push    0f10b50h
9.     push    ecx
10.     call    10A837A0h 11. iload 4
12. if_cmpne 80

13. NoWatch:
14.     mov    eax, DWORD PTR [esp + 18h]
15.     cmp    eax, DWORD PTR [ecx + 08h]
16.     jnz    ___

FIG. 7

```
1.  dconst_1
2.  aload_0
3.  getfield #159
4.          mov    edx, DWORD PTR [ebp + 08h]

5.          jmp    Watch 6.  i2d

WatchRet:
7.          fild   DWORD PTR [eax + 44h]

8.  ldc2_w #191
9.  ddiv
10.         fld    QWORD PTR [F7DB08h]
11.         fdivr  st(0), st(1)
12.         fstp   st(1)

13. areturn

Watch:
14.         push   eax 15.         mov    ecx, DWORD PTR [eax + 44h]
16.         mov    DWORD PTR [ebp + FFFFFFB4h], ecx
17.         mov    edx, DWORD PTR [57F710h]
18.         mov    DWORD PTR [ebp + FFFFFFB8h], edx
19.         fstp   QWORD PTR [ebp + FFFFFFC0h]

20.         push   013282a0h
21.         push   eax
22.         call   10A837A0h 23.         fld    QWORD PTR [ebp + FFFFFFC0h]

24.         pop    eax
25.         jmp    WatchRet
```

*FIG. 8*

1. dconst_1
2. aload_0
3. getfield #159
4.     mov    edx, DWORD PTR [ebp + 08h]

5.     jmp    Watch 6. i2d

WatchRet:
7.     fild    DWORD PTR [eax + 44h]

8. ldc2_w #191
9. ddiv
10.    fld    QWORD PTR [F7DB08h]
11.    fdivr  st(0), st(1)
12.    fstp   st(1)

```
                                    stub
Watch:
        push    eax
        mov     ecx, DWORD PTR [eax + 44h]
        mov     DWORD PTR [ebp + FFFFFFB4h], ecx
        mov     edx, DWORD PTR [57F710h]
        mov     DWORD PTR [ebp + FFFFFFB8h], edx
        fstp    QWORD PTR [ebp + FFFFFFC0h]
        push    013282a0h
        push    eax
        call    10A837A0h
        fld     QWORD PTR [ebp + FFFFFFC0h]
        pop     eax
        jmp     WatchRet
```

FIG. 9

DEBUGGING SUPPORT USING DYNAMIC RE-COMPILATION

BACKGROUND

1. Field of the Invention

This invention relates to compiler. In particular, the invention relates to debugger support.

2. Background of the Invention

Traditional compilers embed the symbol table information into the executables during compilation. After parsing symbol table information and creating efficient data structures to store this information, the debugging and other programming tools can use the symbol table information during their executions.

The amount of memory storage to store the symbol table information may be large. Some compilers may have a limit on the amount of valid symbol table information that can be used. Examples of such compilers include JAVA compilers. A static JAVA compiler converts JAVA source code into a verifiably secure and compact architecture-neutral intermediate format, call JAVA byte codes. A JAVA Virtual Machine interprets the byte code instructions at run time. To improve run-time performance, a Just-In-Time (JIT) JAVA compiler produces native code from JAVA byte code instructions during program execution. However, the symbol table information generated by the JAVA language is not sufficient to be used by the JIT compiler to provide debugging support. This is because the symbol table information in class files is generated for architecture independent byte codes while the JIT compiler generates machine specific instructions.

Existing techniques to provide debugging support have a number of drawbacks. One technique is to construct additional data structures and store all the information that might possibly be used in the future. This technique increases the memory requirement significantly. Another technique is to simulate the translation of byte codes to native instructions and to produce the information when needed. This technique unduly degrades execution performance.

Therefore, there is a need for a technique to provide efficient debugging support.

BRIEF DESCRIPTION OF THE DRAWINGS

The features and advantages of the present invention will become apparent from the following detailed description of the present invention in which:

FIG. 7 is a diagram illustrating an example for the static data access support shown in FIG. 5 according to one embodiment of the invention.

FIG. 8 is a diagram illustrating an example for the semi-static data access support shown in FIG. 5 according to one embodiment of the invention.

FIG. 9 is a diagram illustrating an example for the dynamic data access support shown in FIG. 6 according to one embodiment of the invention.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For examples, although the description of the invention is directed to the JAVA debugging architecture platform, the invention can be practiced for other debugging architecture platforms having similar characteristics.

Figure 1:
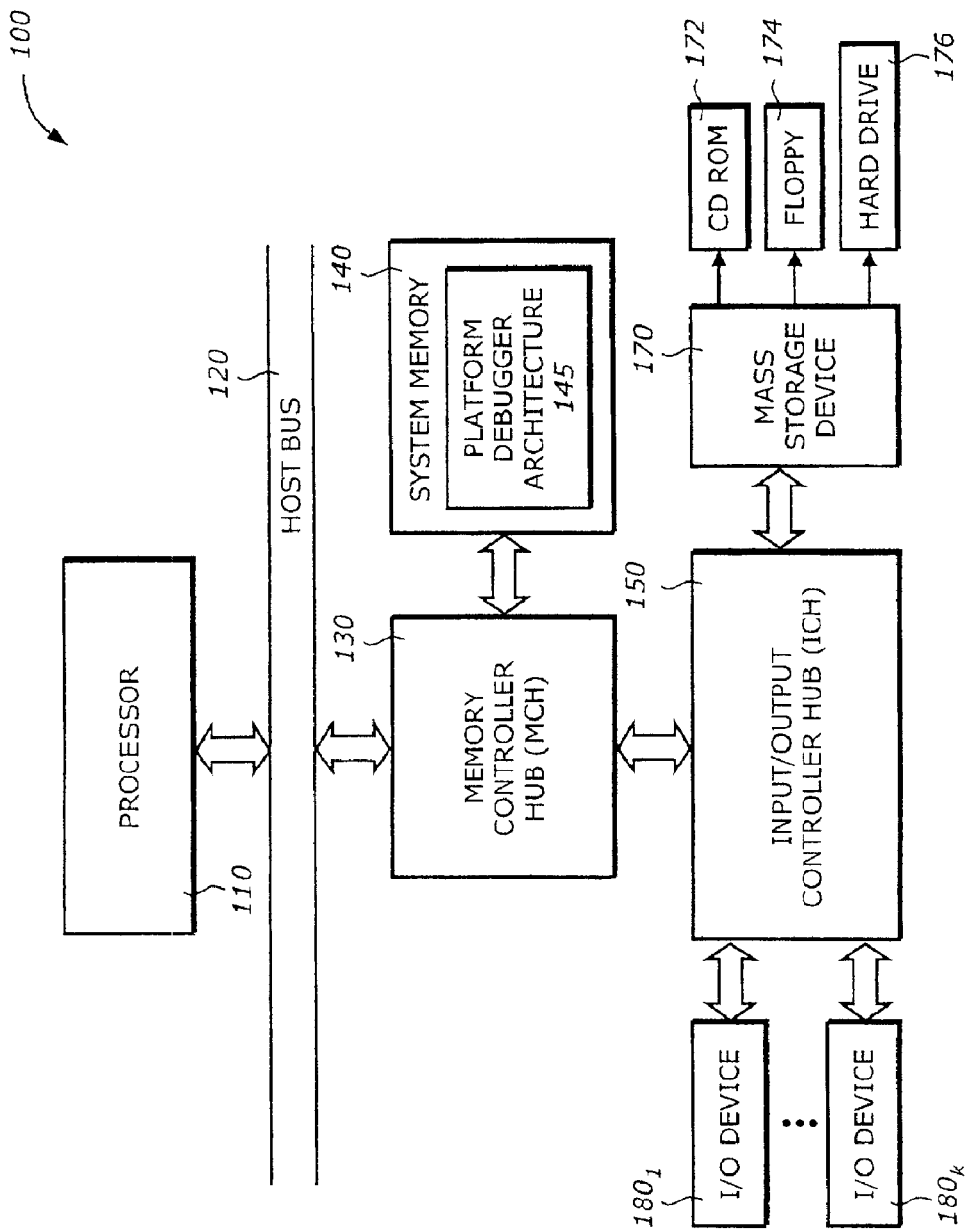
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 120, a memory control hub (MCH) 130, a system memory 140, an input/output control hub (ICH) 150, a mass storage device 170, and input/output devices 180$_1$ to 180$_K$.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory 140 includes a platform debugger architecture 145. The platform debugger architecture 145 may also be implemented by hardware, software, firmware, microcode, or any combination thereof. The system memory 140 may also include other programs or data, which are not shown, such as an operating system. The instruction code stored in the memory 140, when executed by the processor 110, causes the processor to perform the tasks or operations as described in the following.

The ICH 150 has a number of functionalities that are designed to support input/output I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic RF links, etc. The code segments may be downloaded via computer networks such as the Internet, Intranet, etc.

It is noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 2:
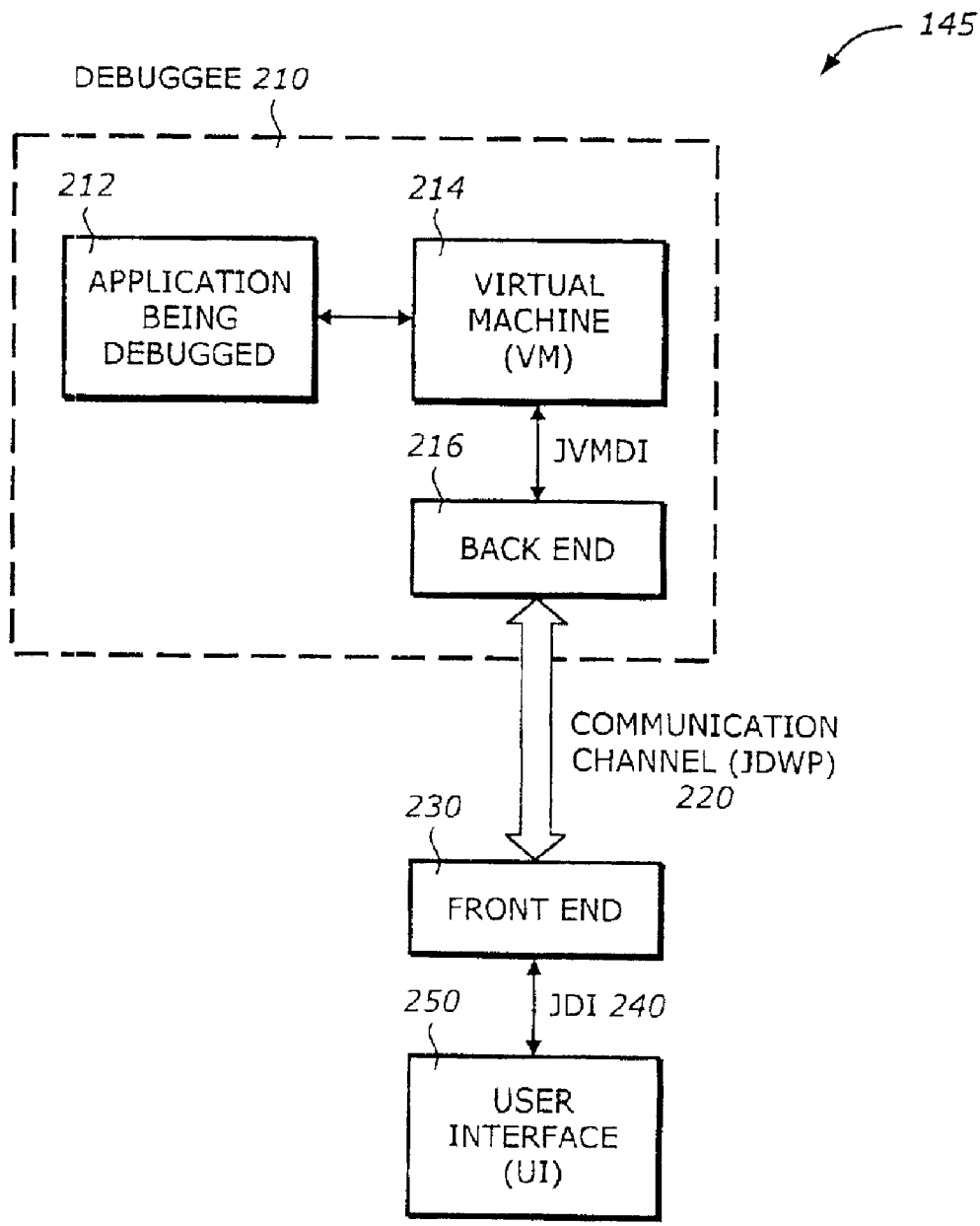
FIG. 2 is a diagram illustrating a platform debugger architecture shown in FIG. 1 according to one embodiment of the invention.

FIG. 2 is a diagram illustrating a platform debugger architecture 145 shown in FIG. 1 according to one embodiment of the invention. The platform debugger architecture 145 includes a debuggee 210, a communication channel 220, a front-end 230, a debug interface 240, and a user interface 250.

The debuggee 210 is a process being debugged. The debuggee 210 includes an application 212, a virtual machine 214, and a back-end 216. The application 212 is the user's application or program being debugged. The application 212 includes the debugging mechanisms for data access support to be described later. The virtual machine 214 is an abstract model instantiated for the platform to run the application 212. In one embodiment, the virtual machine 214 is a JAVA virtual machine (JVM) implementing the JAVA Virtual Machine Debug Interface (JVMDI). The back-end 216 communicates with the front-end 230 via the communication channel 220. The back-end 216 receives requests from the front-end and passes the requests to the virtual machine 214. The back-end 216 sends response to the requests from the virtual machine 214 to the front-end 230. The communication channel 220 is the link between the front end 230 and the back end 216. The transport mechanism for the communication channel 220 may be any one of sockets, serial lines, and shared memory. In one embodiment, the format and semantics of the serialized bit-stream flowing over the channel 220 is specified by the JAVA Debug Wire Protocol (JDWP). The front end 230 sends requests from user to, and receives response from, the back end 216. In one embodiment, the front end 230 implements the high-level JAVA Debug Interface (JDI) and uses the information from the low-level JDWP. The user interface 250 provides interface to user for interactions with the application 212. The user interface 250 may be implemented by any vendor specific tool. In one embodiment the user interface 250 is client of the JDI.

Figure 3:
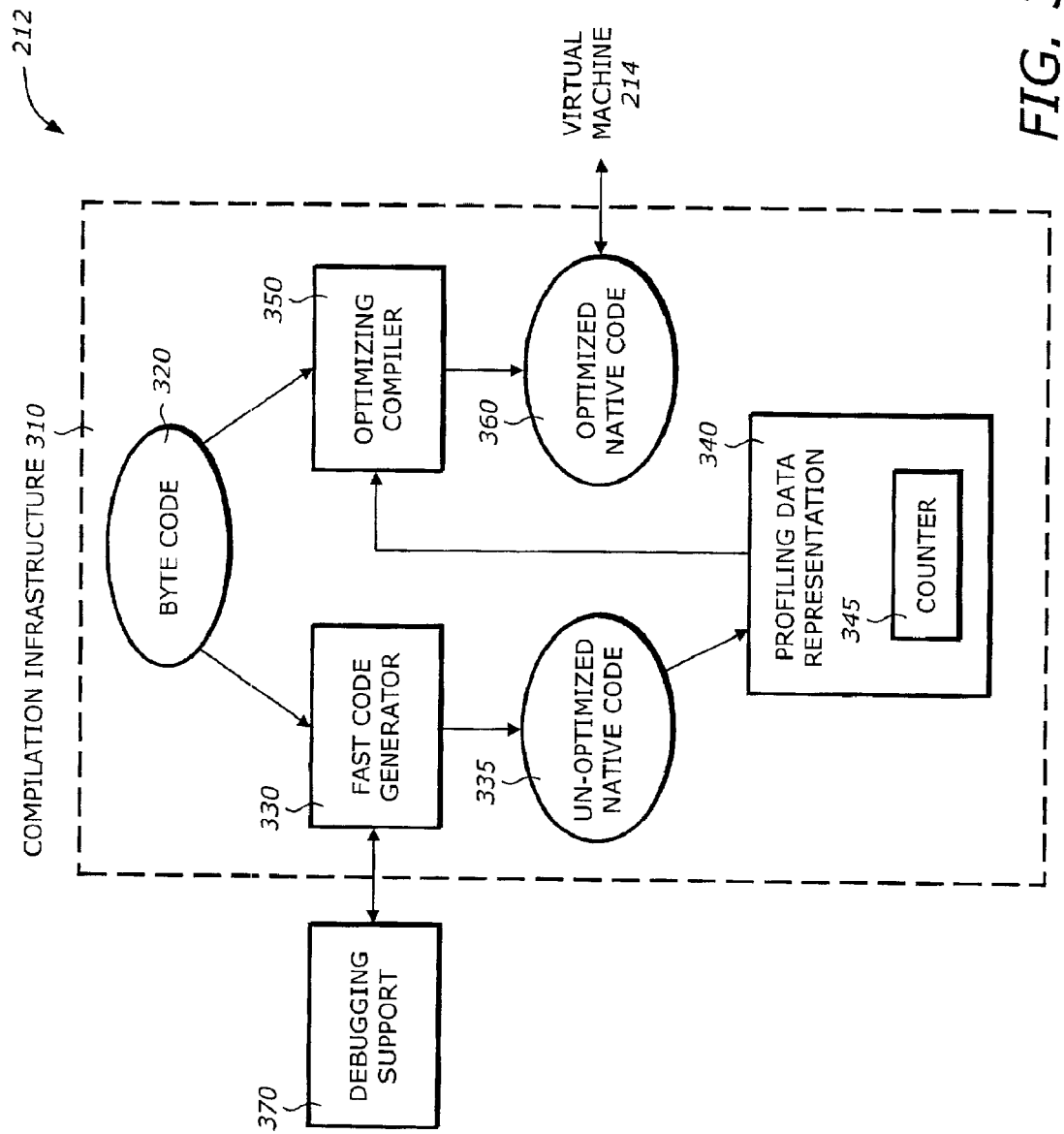
FIG. 3 is a diagram illustrating an application shown in FIG. 2 according to one embodiment of the invention.

FIG. 3 is a diagram illustrating the application 212 shown in FIG. 2 according to one embodiment of the invention. The application 212 includes a compilation infrastructure 310 and a debugging support 370.

The compilation infrastructure 310 compiles a source code into, optimized native code to be run on the virtual machine 214 (FIG. 2). The compilation infrastructure 310 includes a fast code generator 330, a profile representation 340, and an optimizing compiler 350. The fast code generator 330 compiles methods in a byte code sequence 320 using the debug support code from the debug support 370 into un-optimized native code 335. In one embodiment, the fast code generator 330 and the optimizing compiler 350 are part of a Just-In-Time (JIT) compiler such as the Intel JIT compiler. The fast code generator 330 does not generate any explicit intermediate representation to translate JAVA byte codes to native instructions of the underlying processor (e.g., Intel IA-32 and Intel IA-64). Rather, the fast code generator 330 uses the byte codes themselves to represent expressions and maintains auxiliary data structures that are managed on the fly during compilation. Since the fast code generation takes only two-linear time traversals over byte codes to produce the native code, compilation is simple and significantly fast. For this reason, dynamic re-compilation can be used efficiently to provide debugging information instead of computing and storing data structures for symbol table information. The profile data representation 340 includes statistics of information during execution compiled and collected by a counter 345. The optimizing compiler 350 re-compiles methods that are identified as hot methods based on the collected profiling information and generates the optimized native code 360.

The debug support 370 includes a number of debugging support mechanisms to enhance the debug performance. The debug support 370 provides instrumentation code to be used by the fast code generator 330 for accessing data values, stack frame, and manipulating control and data break points.

Figure 4:
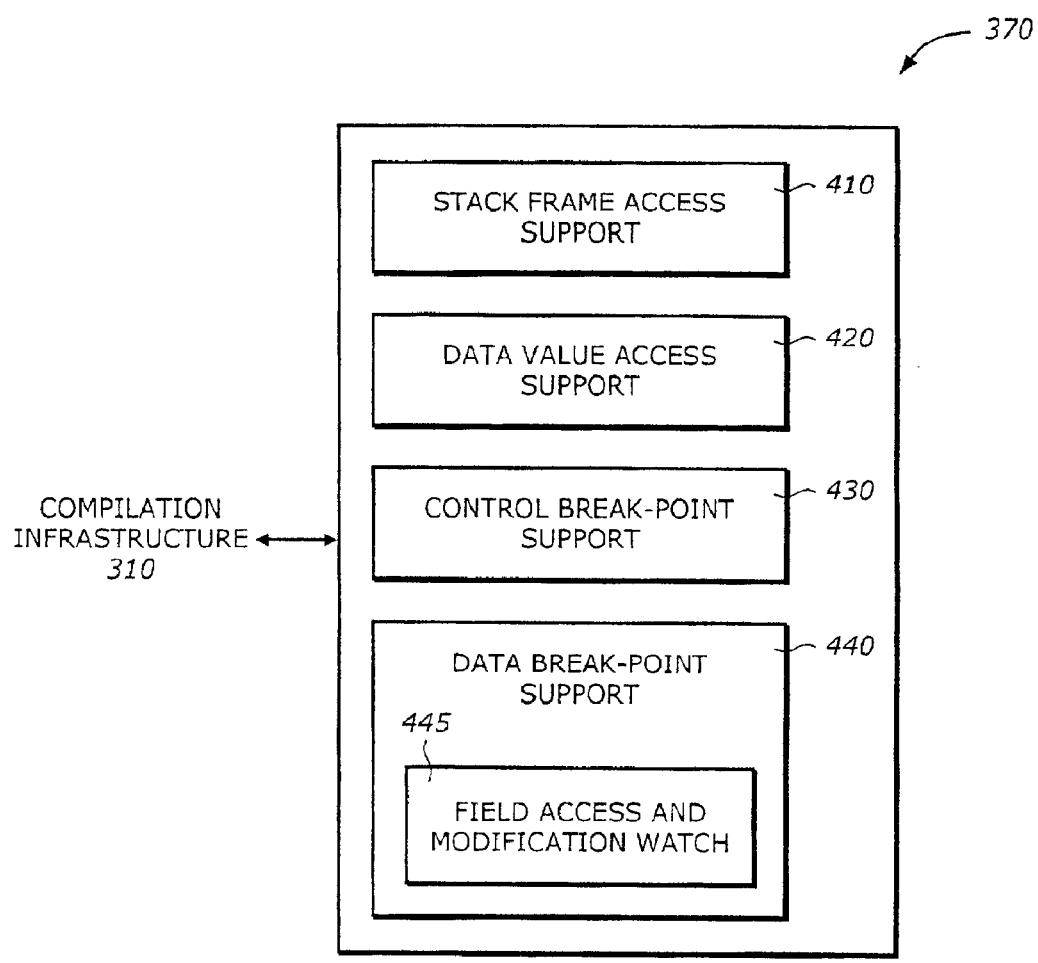
FIG. 4 is a diagram illustrating a debugging support shown in FIG. 3 according to one embodiment of the invention.

FIG. 4 is a diagram illustrating the debugging support 370 shown in FIG. 3 according to one embodiment of the invention. The debug support 370 includes a stack frame access support 410, a data value access support 420, a control break-point support 430, and a data break-point support 440.

The stack frame access support 410 provides support for stack frame accesses. For stack frame accesses, the JIT compiler provides a mechanism to identify and access the caller's frame context, referred to as unwinding stack frame. The stack unwinding process starts with a frame context of the caller. If the active frame belongs to a JAVA method compiled by JIT compiler (referred to as jitted method), the VM makes calls to the compiler to perform the unwinding operation. This is due to the fact that the compiler has all information about the layout of the frames. The information about the return ip, location and size of spill area, location for saving callee-save registers and outgoing arguments can be obtained from JIT compiler for jitted methods. However, if the active frame does not belong to any jitted method, the VM uses its internal data structures to find the caller's context.

A Garbage Collection (GC) map is generated during compilation for each method, allowing the compiler to unwind stack frames for exception and compute the root set of live references for garbage collection. The GC map can be computed by a lazy approach. A small GC map, which contains some minimal but essential information, is generated when a method is compiled for the first time after its first invocation. JIT compiler recompiles the method to produce full GC map when it needs to compute the root set or unwind the stack frame for the method.

The data value access support 420 provides access to values of variables or contents of memory location at any time during program execution. The fast code generator performs simple register allocation during native code generation by mapping local variables to dedicated registers or locations in the spill area. To support data-value accesses, JIT compiler provides a run-time library function call that returns the address of the location where a local variable resides. The address of the variable can be either in the spill area of stack frame or the callee-save area depending on whether or not the variable was assigned to a callee-save register during the simple register allocation phase. The run-time library function call retrieves the address of the variable in three steps: First, the full GC map is retrieved. Dynamic recompilation of a method happens at this point if the full GC map does not already exist. Second, the JIT compiler constructs the frame context for the current method to figure out the stack frame layout of the method. Finally, the JIT compiler uses the mapping of registers to variables, stored in the GC map, to compute the address of the variable.

The control breakpoint support 430 allows user to stop program execution at desired locations or when certain conditions are satisfied. Breakpoints can be implemented using two different techniques: trap patching and code patching. Traps to the operating systems introduce a significant overhead to transferring control to the operating system. Assembling the replacement code in a stub and replacing a segment of original code using branch or jump instructions into the stub usually implement code patching. Code patching has no intervention from the operating system since it transfers control directly via the replacement code. Both approaches provide a location map where the original code needs to be replaced with a branch or trap instruction.

The fast code generator 330 (FIG. 3) performs several simple optimizations such as strength reduction and constant folding during compilation of byte codes to the native code. It does not perform more aggressive optimizations such as code motion, dead code elimination, or instruction scheduling, which could potentially cause the code location problem. The lazy code selector passes over the byte code sequence and generates a sequence of native instructions for each byte code. The generated native instruction sequence is emitted to a code buffer that is used later to update branch offsets and read-only data section offsets. During the emission of native code, the JIT compiler keeps track of both the following emit offset in the code buffer and the offset of the byte code stream. The code location map is computed using both the byte code and the emit offset.

The JIT compiler does not generate the code location map until it is needed. That is, when a method is first compiled the code location map is not generated. However, when a breakpoint is set or cleared, the code location map is generated using dynamic recompilation. To set or clear a breakpoint, the JIT compiler provides an interface function call to a runtime library function, that triggers dynamic recompilation and returns the native code offset for a given byte code in a method. As soon as the lazy code selector reaches the byte code offset, the recompilation is terminated and the next emit offset is returned. The location map generated for future uses may not be stored since recompilation is transparent to the users and it produces the information needed efficiently without introducing a significant runtime overhead.

The data break-point 440 provides users with a mechanism to stop the program execution in terms of the program's memory states. Data break-points are also referred to as watch points. JAVA is a type safe language that does not allow arbitrary memory updates in the heap. Therefore, JVMDI does not have the interface that monitors any arbitrary memory location but have the support for field watches. Data breakpoint is one of the crucial features for tracking or isolating bugs in software that are otherwise hard or even impossible to find. The data break-point support 440 includes a field access and modifications watch 445 to provide support for field watches.

The JVMDI specification for field watches requires an event hook function to be called every time the watched field is accessed or modified. Field access events are generated when the field specified is about to be accessed. Field accesses from JAVA Language code or from JNI are watched. Field accessed by other means is not watched. Similarly, field modification events are generated when the specified field is about to be modified from JAVA Language code or from JNI. JVMDI also supports cancellation of field watches during program execution. For each event generated, the hook function is called with an argument describing the event type and additional information specific to the event.

The field access events need information about the thread that event occurred, the class whose method accessed the field, the method that accessed the field, the location of the access, the class of the field, the filed itself, and the object of which the corresponding field is accessed. Similarly, for modification events, the same information is passed to the event hook function with addition to the signature of the field and the new value that is written to the field.

For JVM that interprets the byte code sequence at run time, field watch support can be handled in a straightforward way using the information in the constant pool. As interpreting getstatic, putstatic, getfield and putfield byte code, the JVM calls the event hook function if the field needs to be watched. For JIT compilation, a method is compiled to native code prior to its first execution. To support the watchpoints for fields, the JIT compiler interrupts the execution before the field access and modification points to call the event hook function.

The basic support for field watch is to insert an instrumentation code to the method's code space. This instrumentation code passes necessary information to a run-time library function, which calls the event hook function. To prevent significant runtime overhead caused by un-activated filed watches, the execution of the instrumentation code is guarded by modifying the method's address space or using Boolean flag for each JAVA class field.

The run-time library functions are native functions that have different calling conventions than the JAVA class methods. They also require different handling to keep track of the live root set for garbage collection. Due to these differences and some other bookkeeping operations performed by the JVM, the native methods are not directly called from the method's code space. Instead, they are called through a stub that prepares the epilog and prolog, and passes the arguments to the native method. Thus, for each instrumentation code inserted for field access or modification, there is a call to stub that calls the run-time library function. The JIT compiler generates spills for the operands on the mimic stack that are live across the call sites prior to the calls to the stub. Only the operands, such as floating point operands and local variables, that may be killed by the call sites are saved.

The field access and modification watch 445 has three models or approaches static, semi-static, and dynamic. The three models, or approaches, differ by where and when the additional instrumentation code is inserted and how the execution of the instrumentation code is guarded during debugging support. In the static model, the additional code is inserted in method's address space at compilation time and its execution is guarded using a Boolean flag. In the semi-static model, the additional code is inserted at the end of the method's code space and/or a no-op (NOP) instruction sequence is inserted to the location that access or modify fields. The execution of the instrumentation code is guarded by changing NOP instruction sequence to a jump instruction. In the dynamic model, dynamic recompilation is used to insert the instrumentation code when needed. All three models or use the same mechanism to pass the arguments to and call the run-time library function that calls the event hook function.

Figure 5:
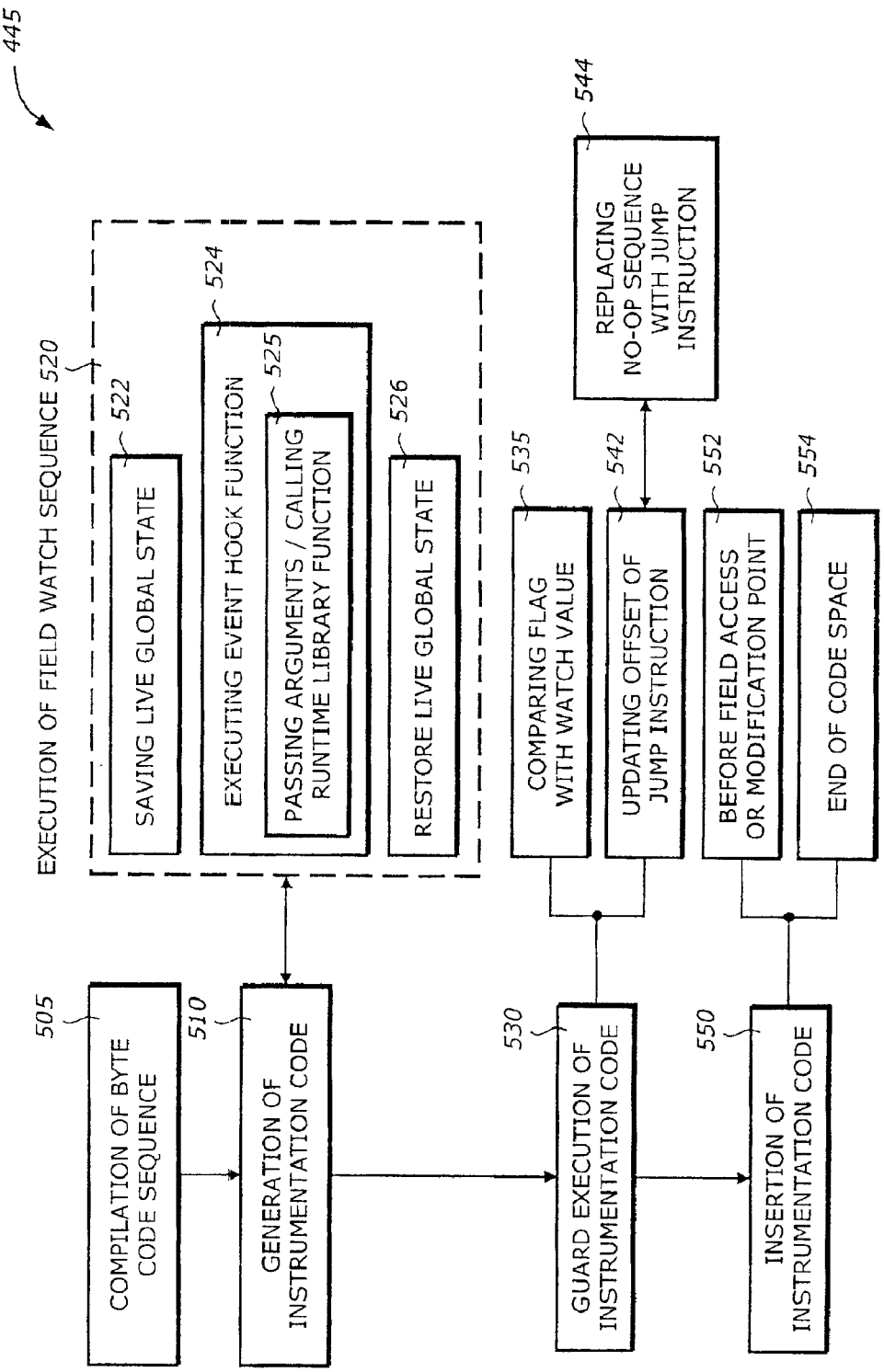
FIG. 5 is a diagram illustrating a static and semi-static data access support shown in FIG. 4 according to one embodiment of the invention.

FIG. 5 is a diagram illustrating a static and semi-static data access support 445 shown in FIG. 4 according to one embodiment of the invention. The static and semi-static data access support 445 includes a compilation 505 generation of an instrumentation code 510, a guard of execution 530, and an insertion of instrumentation code 550. Both static and semi-static models insert the instrumentation code for field watches in the method. For the static model, the instrumentation code is inserted before the field access or modification points. For the semi-static model, the instrumentation code is contained in a stub located at the end of the method's code space, after the original byte code sequence is compiled and emitted.

The compilation 505 compiles a function that is in byte code format to produce native code. In one embodiment, the function is a JAVA method. The compiled function occupies a code space.

The generation 510 generates an instrumentation code corresponding to a field watch of a field. In one embodiment, the field is a JAVA field and the field watch is a JAVA field watch as specified in the JVMDI. The generation 510 executes a field watch sequence (Block 520). For the static model, the execution of the field watch sequence is performed whether or not the field watch is activated. This field watch sequence includes the instruction sequence to spill the mimic stack operands, which are live at the field access point, to their canonical spill locations. For the semi-static model, the execution of the field watch sequence is performed when the field watch is activated. The execution of the field watch sequence 520 includes saving live global state (Block 522), executing an event hook function for an event corresponding to the field watch (Block 524), and restoring the live global state (Block 526). The live global state corresponds to an active register such as scratch registers or floating-point registers.

The guard 530 guards execution of the instrumentation code if the field watch is not activated. For the static model, the guard 530 determines if a field watch is activated by comparing a flag with a predetermined watch value (Block 535). For the semi-static model, the guard 530 has two options: update the offset of a jump instruction to a stub having the field watch sequence (Block 542) or replace a no-op (NOP) sequence with a jump instruction to the stub having the field watch sequence (Block 544). Either one of the blocks 542 and 544 occurs at run time when the field watches are activated.

The insertion 550 inserts the instrumentation code to the native code from the compilation 505. For the static model, the insertion 550 inserts the instrumentation code before a field access or modification point (Block 552). For the semi-static model, the insertion 550 inserts the instrumentation code at the end of the code space of the compiled function (Block 554).

Unlike the static model, the semi-static model executes fewer instructions when no field watch is activated because only one jump instruction is executed. However, when the field watch is activated, the semi-static model executes more instructions because of the additional code to maintain the state of registers and memory consistent. The semi-static model also reduces the instruction cache misses by inserting the instrumentation code at the end of the method's code space, assuming that the user is less likely to activate many field watches at a time.

To activate or clear a field watch, the JVM needs to keep track of the locations where the jump zero instructions are inserted. Unlike the static model, field watch activating or clearing is linear in the number of locations the field is accessed or modified. Additionally, during the compilation of a method, if any field watch is already activated for a field that the method accesses or modifies, the jump instruction is inserted with the offset to the instrumentation code, and not zero.

Figure 6:
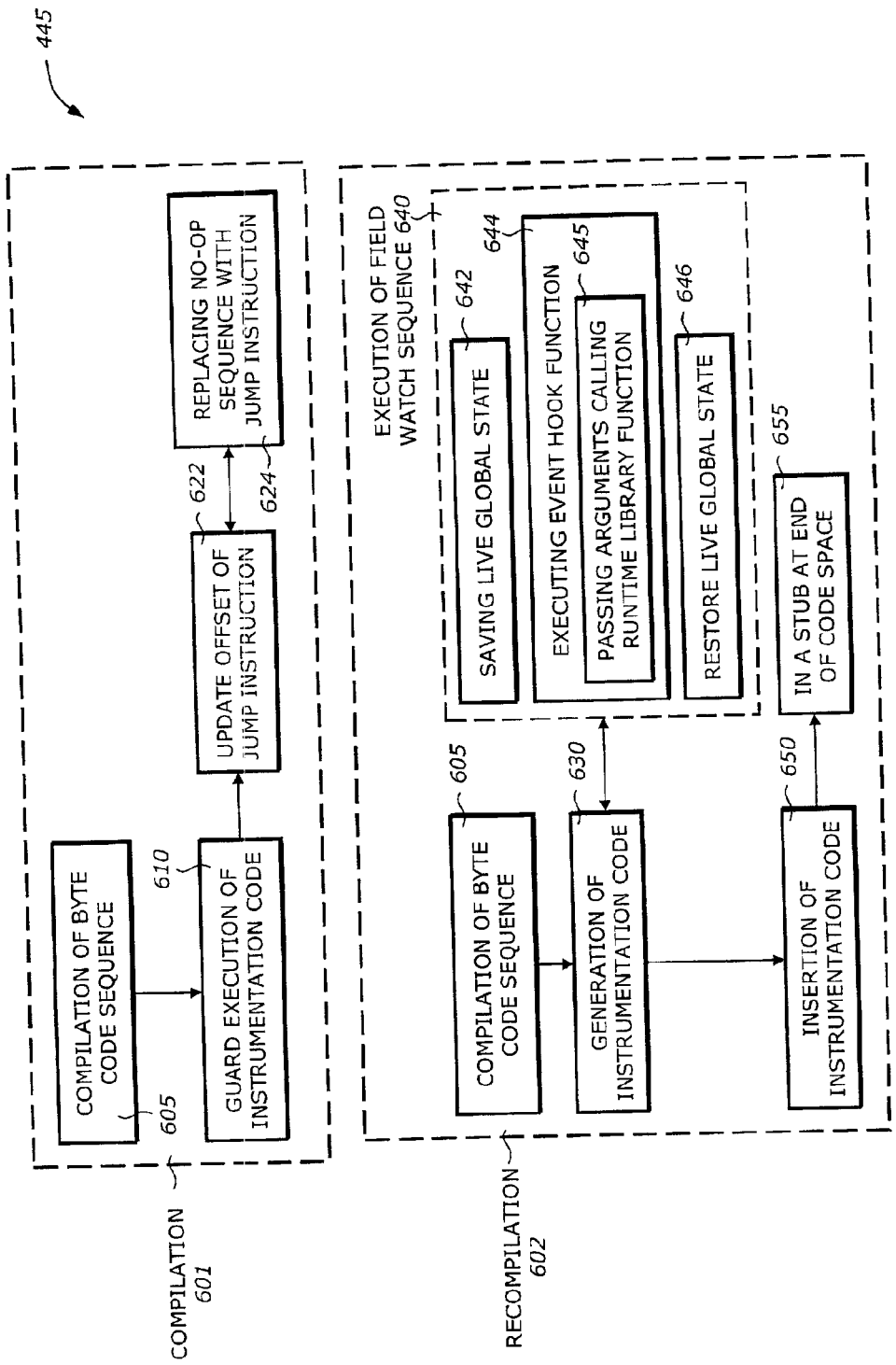
FIG. 6 is a diagram illustrating a dynamic data access support shown in FIG. 4 according to one embodiment of the invention.

FIG. 6 is a diagram illustrating the dynamic data access support 445 shown in FIG. 4 according to one embodiment of the invention. The dynamic data access support 445 includes a compilation 601 and a recompilation 602.

The compilation 601 is the first or initial compilation. It includes a compilation of byte code 605 and a guard of execution 610. The compilation of byte code 605 compiles a byte code sequence having a field byte code that accesses or modifies a field. In one embodiment, the field byte code may be one of a getfield, getstatic, putfield, and putstatic byte codes as defined by the JVM specification (e.g., The JAVA™ Virtual Machine Specification, Second edition, by Tim Lindholm and Frank Yellin, published by Addison-Wesley, 1999).

The guard 610 prevents execution of the instrumentation code if the field watch is not activated. The guard 610 may be implemented by two methods: (1) updating an offset of a jump instruction to the stub when the field watch is activated (Block 622), and (2) replacing a no-op sequence with a jump instruction to the stub (Block 624). The use of a jump instruction is simpler because it merely involves a change of the offset. To clear the field watch, the compiler may either replace the offset of the jump instruction with a zero offset, or replace the jump instruction with a no-op sequence.

The recompilation 602 recompiles a function including the byte code sequence when the field watch is activated. Since it is performed by the fast code generator, the execution is fast and efficient. The recompilation 602 includes the compilation of byte code 605, the guard 610, a generation of instrumentation code 630, and an insertion instrumentation code 650. The generation 630 is essentially similar to the generation 510 (FIG. 5). It generates an instrumentation code corresponding to a field watch of the field. The generation 630 includes an execution 640 of a field watch sequence if the field watch is activated. The execution 640 includes saving live global state (Block 642), executing an event hook function for an event corresponding to the field watch (Block 644), and restoring the live global state (Block 646). The live global state corresponds to an active register such as a live scratch register or a floating-point register. In one embodiment, saving the live global state includes pushing the live global state onto a stack, and restoring the saved live global state includes retrieving it from the stack. The execution of the event hook function includes passing an argument corresponding to the field and calling a run-time library function related to the event (Block 645).

The insertion 650 is similar to the insertion 550 for a semi-static model. It inserts the instrumentation code to the native code. In one embodiment, the insertion 650 inserts the instrumentation code in a stub at the end of the code space of the method (Block 655).

When the field watch is activated, the JIT compiler performs three operations. First, the JIT compiler computes the necessary information for the instrumentation code. Second, the JIT compiler inserts the instrumentation code into the stub. Third, the JIT compiler updates the offset of the jump instruction into the stub containing the field watch sequence of the instrumentation code. In other words, if the field watch is not activated, the stub and the instrumentation code are not generated. In addition, if the field watch is not activated, the offset of the jump instruction is not updated.

Insertion of the jump zero instruction or no-op sequence is only one way to guard the execution of the instruction code. Alternatively, the JIT compiler may relocate several of the original instructions to the stub and replants it with a jump instruction into the stub.

In the dynamic re-compilation, the JIT compiler stores a map from field access and modification points to their stub addresses, if already generated. The generated stubs remain in the code space even after the corresponding field watch is cleared. In other words, the dynamic re-compilation is performed when the stub for a field access or modification point does not exist. Like in the semi-static model, if a field watch is already activated, the JIT compiler generates the stub and inserts the jump to the stub during the compilation of the method. Clearing a field watch replaces the offset of the jump instruction with zero.

FIG. 7 is a diagram illustrating an example for the static data access support shown in FIG. 5 according to one embodiment of the invention.

The byte code "getfield #42" retrieves the value of a non-static field, numbered 42 (line 2), and compares it with the integer value in local register 4 (line 11). Lines 3–5 show the native instruction sequence to spill the mimic stack operands, which are live at the field access point, to their canonical spill locations. This spill code is executed during program execution even though the field access watch may not be activated. This is performed for consistency in memory state, garbage collection, and exception handling tasks.

Lines 6–7 correspond to the guarding function to guard execution of the instrumentation code (lines 8–10). The guard operation takes advantage of the flag usage in the JVM. The JVM stores a Boolean field for each class field in its internal data structures. This Boolean flag is set to true when the field watch is activated and to false when the field watch is cleared. By comparing this flag with this predetermined watch value (e.g., true, or logical 1), the code can determine if the field watch is activated. If the flag is not the same as the watch value, then control passes to NoWatch (line 13), or continuation of the normal byte code execution. Otherwise, lines 8–10 are executed.

Lines 8–10 correspond to the field watch sequence. The execution of the field watch sequence includes passing arguments (e.g., pointer to the internal structure for the field) and calling a run-time library function (line 10).

FIG. 8 is a diagram illustrating an example for the semi-static data access support shown in FIG. 5 according to one embodiment of the invention.

The byte code sequence retrieves the value of a non-static field, numbered 159 (line 3) and casts it to double (line 6). Line 5 is the guard to prevent the instrumentation code (lines 14–25) from being executed when the field watch is not activated. This guard is a jump instruction. The offset of this jump instruction is zero initially before the field watch is activated.

When the field watch is activated, the JIT compiler changes the offset of the jump instruction into the stub containing the field watch sequence of the instrumentation code (line 14). During the lazy code selection, the JIT compiler assumes that the jump to the instrumentation code is not taken. Therefore, no spill code is generated for mimic stack operands at the field access point (line 4). Spilling is delayed until the instrumentation code is actually executed (line 14). Since spilling does not happen at field access or modification points, the global state is saved before the event hook function and is restored afterwards. The global state varies depending on the type of the field access or modification. To maintain consistency for state of memory and registers, any register that is live at the point of instrumentation code execution is saved. For example, line 14 saves the scratch register eax by pushing it onto the stack. Line 24 restores the saved scratch register by retrieving from the stack. Similarly, line 19 is a spill code for floating point values. Line 23 restores the floating point values.

Lines 20 and 21 pass the necessary information before calling to the run-time library function. The first argument is a pointer to the internal structure for the field. The second argument is the pointer to the object being accessed. Line 22 is the call to the run-time library function related to the event.

FIG. 9 is a diagram illustrating an example for the dynamic data access support shown in FIG. 6 according to one embodiment of the invention.

The byte code sequence for the dynamic re-compilation is essentially the same as the semi-static model except that the stub containing the instrumentation code is recompiled when the field watch is activated.

The byte code sequence retrieves the value of a non-static field, numbered 159 (line 3) and casts it to double (line 6). Line 5 is the guard to prevent the instrumentation code contained in the stub from being executed when the field watch is not activated. This guard is a jump instruction. The offset of this jump instruction is zero initially before the field watch is activated.

The stub is generated during re-compilation when the field watch is activated. The stub may be located in any convenient area (e.g., end of the code space). Then, the offset for the jump instruction is updated to the stub.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    re-compiling a function when a field watch for a field is activated, the function including a byte code sequence having a field byte code that accesses or modifies the field, the recompiled function providing a native code an occupying a code space;
    generating an instrumentation code corresponding to the field watch of the field, the instrumentation code including code for executing an event hook function; and
    inserting the instrumentation code to the native code.

2. The method of claim 1, further comprising:
    guarding execution of the instrumentation code if the field watch is not activated.

3. The method of claim 1 wherein generating the instrumentation code comprises:
    executing a field watch sequence if the field watch is activated.

4. The method of claim 3 wherein executing the field watch sequence comprises:
    saving live global state, the live global state corresponding to an active register;
    executing the event hook function for an event corresponding to the field watch; and
    restoring the live global state.

5. The method of claim 4 wherein saving the live global state comprises:
    pushing the live global state onto a stack.

6. The method of claim 5 wherein restoring the live global state comprises:
    retrieving the live global state from the stack.

7. The method of claim 4 wherein executing the event hook function comprises:
    passing an argument corresponding to the field; and
    calling a nm-time library function related to the event.

8. The method of claim 4 wherein the event hook function is compatible with a JAVA Virtual Machine Debug Interface (JVMDI).

9. The method of claim 1 wherein inserting the instrumentation code comprises:
    inserting the instrumentation code in a stub at end of the code space.

10. The method of claim 9 wherein guarding execution of the instrumentation code comprises:
    updating an offset of a jump instruction to the stub when the field watch is activated.

11. The method of claim 10 further comprising:
    clearing the field watch by replacing the offset with a zero offset.

12. The method of claim 9 wherein guarding execution of the instrumentation code comprises:
    replacing a no-op sequence with a jump instruction to the stub.

13. The method of claim 12 further comprising:
    clearing the field watch by replacing the jump instruction with the no-op sequence.

14. The method of claim 1 wherein the function is a JAVA method.

15. The method of claim 1 wherein the field is a JAVA field in a JAVA virtual machine.

16. A computer program product comprising:
    a machine useable medium having computer program code embedded therein, the computer program product having:
    computer readable program code to re-compile a function when a field watch for a field is activated, the function including a byte code sequence having a field byte code that accesses or modifies the field, the recompiled function providing a native code and occupying a code space,
    computer readable program code to generate an instrumentation code corresponding to the field watch of the field, the instrumentation code including code for executing an event hook function; and
    computer readable program code to insert the instrumentation code to the native code.

17. The computer program product of claim 16 further comprising:
    computer readable program code to guard execution of the instrumentation code if the field watch is not activated.

18. The computer program product of claim 16 wherein the computer readable program code to generate the instrumentation code comprises:
    computer readable program code to execute a field watch sequence if the field watch is activated.

19. The computer program product of claim 18 wherein the computer readable program code to execute the field watch sequence comprises:
    computer readable program code to save live global state, the live global state corresponding to an active register,
    computer readable program code to execute the event hook function for an event corresponding to the field watch; and
    computer readable program code to restore the live global state.

20. The computer program product of claim 19 wherein the computer readable program code to save the live global state comprises:
    computer readable program code to push the live global state onto a stack.

21. The computer program product of claim 20 wherein the computer readable program code to restore the live global state comprises:
    computer readable program code to retrieve the live global state from the stack.

22. The computer program product of claim 19 wherein the computer readable program code to execute the event hook function comprises:

computer readable program code to pass an argument corresponding to the field; and computer readable program code to call a run-time library function related to the event.

23. The computer program product of claim 19 wherein the event hook function is compatible with a JAVA Virtual Machine Debug Interface (JVMDI).

24. The computer program product of claim 16 wherein the computer readable program code to insert the instrumentation code comprises:

computer readable program code to insert the instrumentation code in a stub at end of the code space.

25. The computer program product of claim 24 wherein the computer readable program code to guard execution of the instrumentation code comprises:

computer readable program code to update an offset of a jump instruction to the stub when the field watch is activated.

26. The computer program product of claim 25 further comprising:

computer readable program code to clear the field watch by replacing the offset with a zero offset.

27. The computer program product of claim 24 wherein the computer readable program code to guard execution of the instrumentation code comprises:

computer readable program code to replace a no-op sequence with a jump instruction to the stub.

28. The computer program product of claim 27 further comprising;

computer readable program code to clear the field watch by replacing the jump instruction with the no-op sequence.

29. The computer program product of claim 16 wherein the function is a JAVA method.

30. The computer program product of claim 16 wherein the field is a JAVA field in a JAVA virtual machine.

31. A system comprising:

a processor;

a memory coupled to the processor to store instruction code, the instruction code, when executed by the processor, causing the processor to:

re-compile a function when a field watch for a field is activated, the function including a byte code sequence having a field byte code that accesses or modifies the field, the re-compiled function providing a native code and occupying a code space, generate an instrumentation code corresponding to the field watch of the field, the instrumentation code including code for executing an event hook function; and insert the instrumentation code to the native code.

32. The system of claim 31 the instruction code further causing the processor to:

guard execution of the instrumentation code if the field watch is not activated.

33. The system of claim 32 wherein the instruction code causing the processor to guard execution of the instrumentation code causes the processor to:

update an offset of a jump instruction to a stub when the field watch is activated.

34. The system of claim 32 wherein the instruction code causing the processor to guard execution of the instrumentation code causes the processor to:

replace a no-op sequence with a jump instruction to a stub.

35. The system of claim 31 wherein the instruction code causing the processor to generate the instrumentation code causes the processor to:

execute a field watch sequence if the field watch is activated.

36. The system of claim 35 wherein the instruction code causing the processor to execute the field watch sequence causes the processor to:

save live global state, the live global state corresponding to an active register;

execute the event hook function for an event corresponding to the field watch; and restore the live global state.

37. The system of claim 36 wherein the event hook function is compatible with a JAVA Virtual Machine Debug Interface (JVMDI).

38. The system of claim 31 wherein the function is a JAVA method.

39. The system of claim 31 wherein the field is a JAVA field in a JAVA virtual machine.

* * * * *

UNITED STATES PATENT AND TRADEMARK OFFICE
CERTIFICATE OF CORRECTION

| | |
|---|---|
| PATENT NO. | : 6,968,546 B2 |
| APPLICATION NO. | : 09/822090 |
| DATED | : November 22, 2005 |
| INVENTOR(S) | : Lueh |

Page 1 of 1

It is certified that error appears in the above-identified patent and that said Letters Patent is hereby corrected as shown below:

In column 11, at line 60, delete "nm-time" and insert --run-time--.

Signed and Sealed this

Twenty-fourth Day of March, 2009

JOHN DOLL
*Acting Director of the United States Patent and Trademark Office*